(12) United States Patent
Hathaway et al.

(10) Patent No.: US 7,971,908 B2
(45) Date of Patent: Jul. 5, 2011

(54) GUIDE ASSEMBLY FOR A SAFETY BELT

(75) Inventors: Carol C. Hathaway, Rochester, MI (US); Thomas M. DiMambro, Troy, MI (US); Alfred A. Jefferson, Southfield, MI (US); Steven G. Corrion, Oxford, MI (US); Thomas Tilly, Algonac, MI (US); Leslie A. Sajovec, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 104 days.

(21) Appl. No.: 12/474,437

(22) Filed: May 29, 2009

(65) Prior Publication Data

US 2010/0301594 A1 Dec. 2, 2010

(51) Int. Cl.
*B60R 22/30* (2006.01)
*B60R 22/02* (2006.01)

(52) U.S. Cl. ............... 280/808; 280/801.2; 24/115 F; 24/602; 297/482; 297/483; 297/485

(58) Field of Classification Search ............. 280/801.1, 280/801.2, 808; 297/468, 470–472, 481–483, 297/485; 24/115 F, 602, 625, 115 G
See application file for complete search history.

(56) References Cited

U.S. PATENT DOCUMENTS

| | | | | |
|---|---|---|---|---|
| 3,521,901 A * | 7/1970 | Wackym | ........................ | 297/483 |
| 4,179,086 A * | 12/1979 | Yamada | ................. | 244/122 AG |
| 4,336,957 A * | 6/1982 | Schultz et al. | ................ | 280/803 |
| 4,526,431 A * | 7/1985 | Kasukawa | .................... | 439/153 |
| 4,648,625 A * | 3/1987 | Lynch | ........................... | 280/808 |
| 4,840,404 A * | 6/1989 | Falterman | ...................... | 280/808 |
| 4,944,557 A * | 7/1990 | Tsubai | .......................... | 297/468 |
| 4,946,198 A * | 8/1990 | Pittore et al. | .................. | 280/808 |
| 5,080,396 A * | 1/1992 | Vacanti | ......................... | 280/808 |
| 5,135,257 A * | 8/1992 | Short | ............................ | 280/808 |
| 5,308,116 A | 5/1994 | Zawisa et al. | | |
| 5,468,020 A * | 11/1995 | Scime | .......................... | 280/808 |
| 5,839,792 A * | 11/1998 | Baik | ............................ | 297/483 |
| 5,867,877 A * | 2/1999 | Patterson et al. | ............ | 24/598.5 |
| 6,473,947 B2 * | 11/2002 | Yun | ............................. | 24/579.11 |
| 6,832,781 B2 * | 12/2004 | Rastegar et al. | ............. | 280/806 |
| 6,846,020 B2 * | 1/2005 | Xu | ............................... | 280/808 |
| 6,880,893 B1 | 4/2005 | Scotton | | |
| 7,314,235 B2 * | 1/2008 | Downey | ....................... | 280/808 |
| 7,325,279 B2 * | 2/2008 | Huang | ......................... | 24/115 F |
| 7,513,532 B1 * | 4/2009 | Vaughns et al. | .............. | 280/808 |
| 2002/0158457 A1* | 10/2002 | Simmons | .................... | 280/801.1 |
| 2003/0173817 A1* | 9/2003 | Vits et al. | ...................... | 297/484 |
| 2004/0194264 A1* | 10/2004 | Johansson | ....................... | 24/602 |

* cited by examiner

*Primary Examiner* — Toan C To
*Assistant Examiner* — James English
(74) *Attorney, Agent, or Firm* — Quinn Law Group, PLLC

(57) ABSTRACT

A seat assembly includes a seat of a vehicle, a safety belt, and a guide assembly. The seat includes a seat back and an attachment feature that is operatively connected to the seat back. The safety belt includes webbing that is configured to extend in a generally diagonal direction across the seat back. The guide assembly includes a clip, a cord, an attachment mechanism, and a breakaway mechanism. The clip is configured for operative attachment to the webbing of the safety belt. The cord operatively extends from the clip. The attachment mechanism is operatively connected to the cord. The attachment mechanism is configured for selective attachment to the attachment feature of the seat back. The breakaway mechanism operatively interconnects the cord and the clip and is configured to separate such that the cord pulls free from the clip upon the application of a force to the clip or the cord.

12 Claims, 2 Drawing Sheets

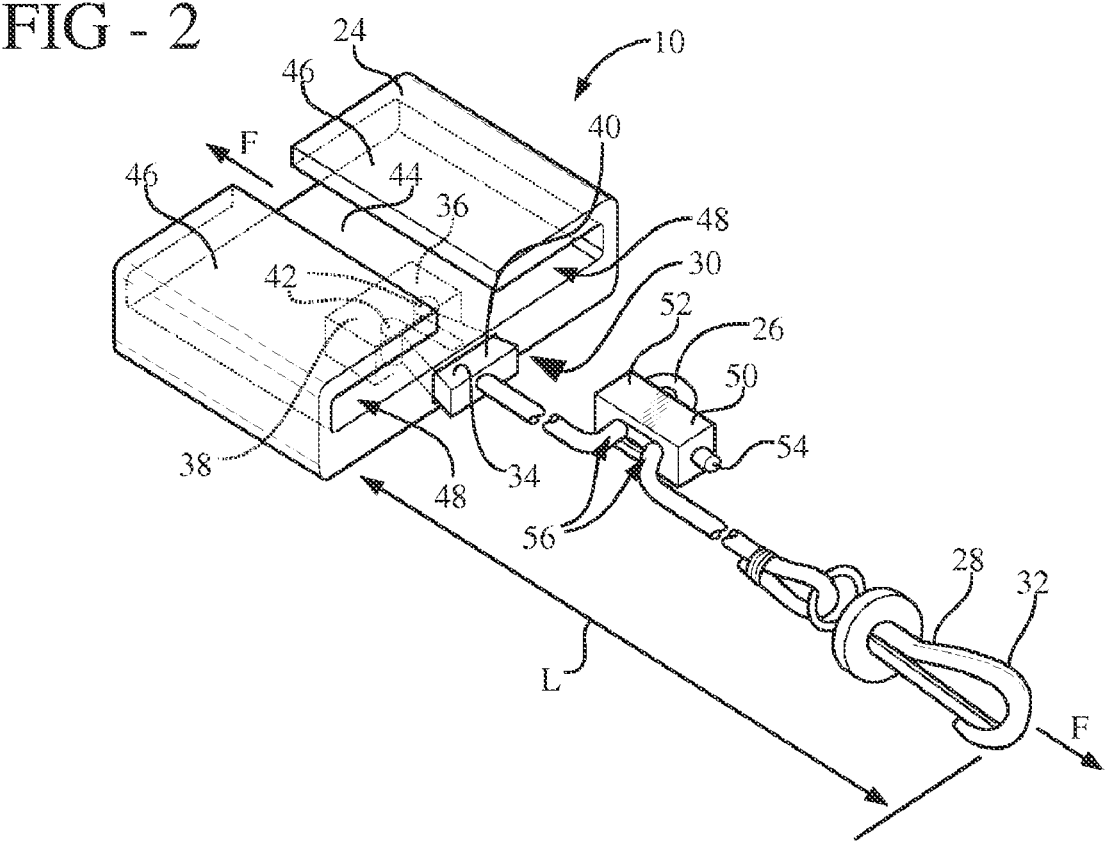
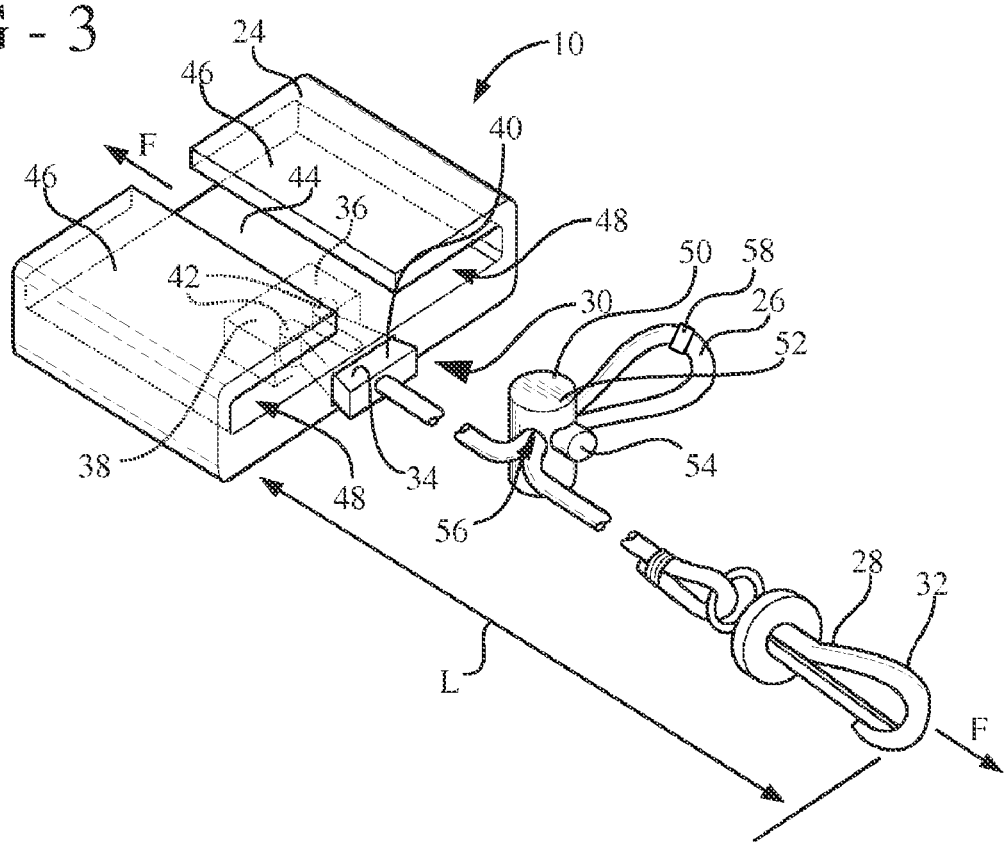

GUIDE ASSEMBLY FOR A SAFETY BELT

TECHNICAL FIELD

The present invention relates to a guide assembly for a safety belt.

BACKGROUND OF THE INVENTION

Current guide assemblies that are used in vehicles are either permanently attached to the vehicle seat or to a trim panel that is remote from the vehicle seat. When a different type of guide assembly is attached to each vehicle, duplicity of guide assemblies may exist. Additionally, when the guide assemblies are attached to the trim panel, the guide assemblies may become damaged or otherwise ripped from the trim panel if not disconnected from webbing of the safety belt prior to folding or tilting the vehicle seat.

SUMMARY OF THE INVENTION

A guide assembly is configured for selectively adjusting a safety belt of a seat. The guide assembly includes a clip, a cord, an attachment mechanism, and a breakaway mechanism. The clip is configured for operative attachment to webbing of the safety belt. The cord operatively extends from the clip. The attachment mechanism is operatively connected to the cord and is configured for selective attachment to the seat. The breakaway mechanism operatively interconnects the cord and the clip. The breakaway mechanism is configured to separate such that the cord pulls free from the clip upon the application of a force to the clip or the cord.

In another aspect of the invention, a seat assembly includes a seat of a vehicle, a safety belt, and a guide assembly. The seat includes a seat back and an attachment feature that is operatively connected to the seat back. The safety belt includes webbing that is configured to extend in a generally diagonal direction across the seat back. The guide assembly includes a clip, a cord, an attachment mechanism, and a breakaway mechanism. The clip is configured for operative attachment to the webbing of the safety belt. The cord operatively extends from the clip. The attachment mechanism is operatively connected to the cord. The attachment mechanism is configured for selective attachment to the attachment feature of the seat back. The breakaway mechanism operatively interconnects the cord and the clip and is configured to separate such that the cord pulls free from the clip upon the application of a force to the clip or the cord.

In yet another aspect of the invention, a guide assembly is configured for selectively adjusting a safety belt of a seat. The guide assembly includes a clip, a cord, a snap hook, an adjustment mechanism, and a breakaway mechanism. The clip is configured for operative attachment to webbing of the safety belt. The cord operatively extends from the clip. The snap hook is operatively connected to the cord. The adjustment mechanism is operatively attached to the cord between the clip and the snap hook and is configured for adjusting an operative length of the guide assembly. The adjustment mechanism is configured for selective attachment to the seat. The breakaway mechanism operatively interconnects the cord and the clip and is configured to separate such that the cord pulls free from the clip upon the application of a sufficient force to the clip or the cord.

By attaching a guide assembly between the webbing of the safety belt and the seat back of the seat, the safety belt may be rerouted to accommodate smaller occupants using the safety belt. The ability to selectively attach the guide assembly to the seat back allows the guide assembly to be adapted to all seating positions with shoulder belts. By providing a breakaway mechanism, the cord will easily separate or breakaway from the seat under misuse, with the ability to be reattached to the clip without causing damage to the guide assembly or the seat.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike:

FIG. 2 is schematic perspective view of the guide assembly of FIG. 1; and

FIG. 3 is a schematic perspective view of an alternative embodiment of the guide assembly of FIG. 1.

DESCRIPTION OF THE PREFERRED EMBODIMENTS

Figure 1:
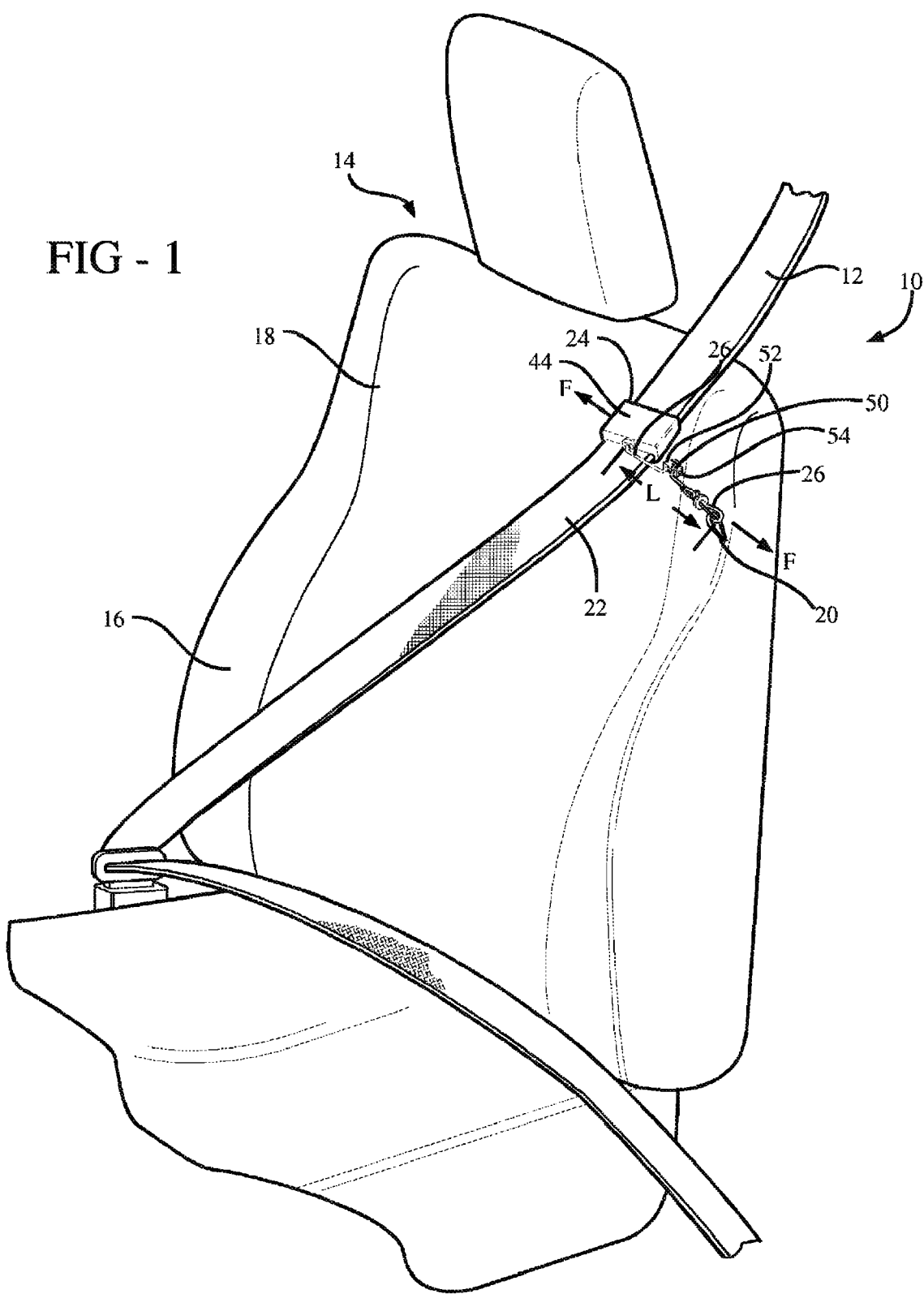
FIG. 1 is a schematic front perspective view of a seat of a vehicle illustrating a guide assembly attached to webbing of a safety belt.

Referring to the drawings, wherein like reference numbers refer to like components, FIG. 1 shows a guide assembly 10 in use with a safety belt 12 of a seat assembly 14 of a vehicle (not shown). The seat assembly 14 includes a seat 16 having a seat back 18 and an attachment feature 20 that is operatively connected to the seat back 18. The safety belt 12 includes webbing 22 that selectively extends in a generally diagonal direction across the seat back 18 when strapped over a user (not shown) of the vehicle.

Referring to FIGS. 2 and 3, the guide assembly 10 includes a clip 24, a cord 26, an attachment mechanism 28, and a breakaway mechanism 30. The clip 24 is configured for operative attachment to webbing 22 of the safety belt 12. More specifically, the clip 24 is configured for attachment to the webbing 22 that extends over the shoulder area of the user to provide comfort to the user and/or help aid in proper use of the safety belt 12 by the user. The cord 26 operatively extends from the clip 24. The attachment mechanism 28 is operatively connected to the cord 26. The attachment mechanism 28 is configured for selective attachment to the seat 16. Referring to FIGS. 1-3, the breakaway mechanism 30 operatively interconnects the cord 26 and the clip 24 and is configured to separate such that the cord 26 pulls free from the clip 24 upon the application of a sufficient force F to either the clip 24 or the cord 16.

The attachment mechanism 28 may be a snap hook 32. Alternatively, the attachment mechanism 28 may be a snap, ball/button in a loop, a magnetic snap (e.g., a "purse closure"), etc. It should be appreciated, however, that the attachment mechanism 28 may be any other mechanism that is configured to selectively engage and disengage the attachment feature 20 extending from the seat back 18.

Referring to FIGS. 2 and 3, the breakaway mechanism 30 includes a male portion 34 inter-engaging a female portion 36. The female portion 36 is disposed in the clip 24 and the male portion 34 inter-engages the female portion 36. The female portion 36 defines a cavity 38 configured for receiving the male portion 34. The male portion 34 includes a base 40 that is operatively connected to the cord 26 and a pair of fingers 42 resiliently extend from the base 40 in spaced and generally parallel relationship to one another. The fingers 42 extend into the cavity 38 to inter-engage the female portion 36. Upon the application of the force F to the cord 26, the fingers 42 pull free of the female portion 36 and out of the cavity 38. Once the fingers 42 of the male portion 34 pull free of the female portion 36, the user may selectively reattach the male portion 34 to the female portion 36 by reinserting the fingers 42 into the cavity 38 of the female portion 36.

Referring to FIGS. 2 and 3, the clip 24 includes a face portion 44 and a pair of tabs 46 extending toward one another from ends of the face portion 44. A recess 48 is defined between each of the tabs 46 and the face portion 44 for receiving and supporting a portion of the webbing 22 of the safety belt 12. The face portion 44 defines the female portion 36 of the breakaway mechanism 30. Referring to the Figures, the face portion 44 defines the female portion 36 extending in generally perpendicular relationship to the pair of tabs 46. Alternatively, the face portion 44 may define the female portion 36 to extend in generally parallel relationship to the tabs 46 from one of the ends of the face portion 44. It should be appreciated, however, that the breakaway mechanism 30 may be configured in any other configuration and/or mechanism known to those skilled in the art.

The cord 26 may be elastic. It should be appreciated, however, that the cord 26 is not limited to being elastic, as the cord 26 may have any other properties known to those skilled in the art.

An adjustment mechanism 50 may be operatively attached to the cord 26. The adjustment mechanism 50 is configured for adjusting an operative length L of the guide assembly 10. The operative length L is generally determined based on the size of the occupant using the safety belt 12 in the seat 16. The adjustment mechanism 50 includes a body 52 and a biasing member 54. The body 52 defines at least one aperture 56. The cord 26 extends through the at least one aperture 56. In the embodiment shown in FIG. 2, the adjustment mechanism 50 includes two apertures 56. Alternatively, in the embodiment shown in FIG. 3, the adjustment mechanism 50 includes only one aperture 56. The biasing member 54 extends into the body 52. The biasing member 54 is movable relative to the body 52 to selectively exert tension on the cord 26 that extends through the aperture(s) 56 to retain the cord 26 at the operative length L. The biasing member 54 is movable relative to the body 52 to selectively release tension exerted on the portion of the cord 26 that extends through the aperture(s) 56 to selectively move the cord 26 through the at least one aperture 56 and change the operative length L of the cord 26. It should be appreciated however, that the adjustment mechanism 50 is not limited to the embodiments shown herein, as any other adjustment mechanism 50 that is suitable for selectively adjusting the operative length L of the guide assembly 10 may also be used as known to those skilled in the art.

Referring to FIG. 3, a stop 58 may be operatively connected to the cord 26. The stop 58 is configured for preventing the adjustment mechanism 50 from being removed from the cord 26 as the adjustment mechanism 50 is selectively moved through the single aperture 56 to adjust the operative length L of the guide assembly 10.

While the best modes for carrying out the invention have been described in detail, those familiar with the art to which this invention relates will recognize various alternative designs and embodiments for practicing the invention within the scope of the appended claims.

The invention claimed is:

1. A guide assembly configured for selectively adjusting a safety belt of a seat, said guide assembly comprising:

a clip configured for operative attachment to webbing of the safety belt;
a cord operatively extending from said clip;
an attachment mechanism operatively connected to said cord;
wherein said attachment mechanism is configured for selective attachment to the seat; and
a breakaway mechanism operatively interconnecting said cord and said clip;
wherein said breakaway mechanism includes a male portion inter-engaging a female portion;
wherein said male portion includes a base operatively connected to said cord and a pair of fingers resiliently extending from said base in spaced and generally parallel relationship to one another;
wherein said female portion defines a cavity within said clip and said female portion is configured for receiving said male portion such that said fingers extend into said cavity to inter-engage said female portion; and
wherein said pair of fingers are configured to pull free of said female portion and out of said cavity upon the application of a sufficient force to said cord to separate said breakaway mechanism such that said cord pulls free from said clip.

2. A guide assembly, as set forth in claim 1, wherein said attachment mechanism is a snap hook.

3. A guide assembly, as set forth in claim 1, wherein said clip includes a face portion and a pair of tabs extending toward one another from ends of said face portion;
wherein a recess is defined between each of said tabs and said face portion for receiving and supporting a portion of the webbing of the safety belt.

4. A guide assembly, as set forth in claim 3, wherein said face portion defines said female portion of said breakaway mechanism.

5. A guide assembly, as set forth in claim 2, wherein said cord is elastic.

6. A guide assembly, as set forth in claim 1, further comprising an adjustment mechanism operatively attached to said cord, wherein said adjustment mechanism is configured for adjusting an operative length of said guide assembly.

7. A guide assembly, as set forth in claim 6, wherein said adjustment mechanism includes:
a body defining at least one aperture with said cord extending through said at least one aperture;
a biasing member extending into said body;
wherein said biasing member is movable relative to said body to selectively exert tension on said cord extending through said at least one aperture to retain said cord at said operative length;
wherein said biasing member is movable relative to said body to selectively release tension exerted on said cord extending through said at least one aperture to move said cord through said at least one aperture to change said operative length of said cord.

8. A guide assembly, as set forth in claim 6, further comprising a stop operatively connected to said cord;
wherein said stop is configured for preventing said adjustment mechanism from being removed from said cord as said adjustment mechanism adjusts said operative length of said guide assembly.

9. A seat assembly for a vehicle comprising:
a seat having a seat back and an attachment feature operatively connected to said seat back;
a safety belt having webbing configured to extend in a generally diagonal direction across said seat back;
a guide assembly including;

a clip configured for operative attachment to said webbing of said safety belt;

a cord operatively extending from said clip;

an attachment mechanism operatively connected to said cord;

wherein said attachment mechanism is configured for selective attachment to said attachment feature of said seat back; and a breakaway mechanism operatively interconnecting said cord and said clip;

wherein said breakaway mechanism includes a male portion inter-engaging a female portion;

wherein said male portion includes a base operatively connected to said cord and a pair of fingers resiliently extending from said base in spaced and generally parallel relationship to one another;

wherein said female portion defines a cavity within said clip and said female portion is configured for receiving said male portion such that said fingers extend into said cavity to inter-engage said female portion; and wherein said pair of fingers are configured to pull free of said female portion and out of said cavity upon the application of a sufficient force to said cord to separate said breakaway mechanism such that said cord pulls free from said clip.

10. A seat assembly, as set forth in claim 9, further comprising an adjustment mechanism operatively attached to said cord, wherein said adjustment mechanism is configured for adjusting an operative length of said guide assembly.

11. A seat assembly, as set forth in claim 10, wherein said adjustment mechanism includes:

a body defining at least one aperture with said cord extending through said at least one aperture;

a biasing member extending into said body;

wherein said biasing member is movable relative to said body to selectively exert tension on said cord extending through said at least one aperture to retain said cord at said operative length;

wherein said biasing member is movable relative to said body to selectively release tension exerted on said core extending through said at least one aperture to move said cord through said at least one aperture to change said operative length of said cord.

12. A guide assembly configured for selectively adjusting a safety belt of a seat, said guide assembly comprising:

a clip configured for operative attachment to webbing of the safety belt;

a cord operatively extending from said clip;

a snap hook operatively connected to said cord;

an adjustment mechanism operatively attached to said cord between said clip and said snap hook, wherein said adjustment mechanism is configured for adjusting an operative length of said guide assembly;

wherein said adjustment mechanism is configured for selective attachment to the seat; and a breakaway mechanism operatively interconnecting said cord and said clip;

wherein said breakaway mechanism includes a male portion inter-engaging a female portion;

wherein said male portion includes a base operatively connected to said cord and a pair of fingers resiliently extending from said base in spaced and generally parallel relationship to one another;

wherein said female portion defines a cavity within said clip and said female portion is configured for receiving said male portion such that said fingers extend into said cavity to inter-engage said female portion; and wherein said pair of fingers are configured to pull free of said female portion and out of said cavity upon the application of a sufficient force to said cord to separate said breakaway mechanism such that said cord pulls free from said clip.

* * * * *